United States Patent
Drake et al.

(10) Patent No.: US 10,088,166 B2
(45) Date of Patent: Oct. 2, 2018

(54) SWIRLER MOUNT INTERFACE FOR GAS TURBINE ENGINE COMBUSTOR

(71) Applicant: United Technologies Corporation, Hartford, CT (US)

(72) Inventors: Christopher Drake, West Hartford, CT (US); Seth A. Max, Manchester, CT (US); Meggan Harris, Colchester, CT (US)

(73) Assignee: United Technologies Corporation, Farmington, CT (US)

(*) Notice: Subject to any disclaimer, the term of this patent is extended or adjusted under 35 U.S.C. 154(b) by 282 days.

(21) Appl. No.: 14/904,490

(22) PCT Filed: May 15, 2014

(86) PCT No.: PCT/US2014/038198
§ 371 (c)(1),
(2) Date: Jan. 12, 2016

(87) PCT Pub. No.: WO2015/017002
PCT Pub. Date: Feb. 5, 2015

(65) Prior Publication Data
US 2016/0169521 A1    Jun. 16, 2016

Related U.S. Application Data (60) Provisional application No. 61/878,346, filed on Sep. 16, 2013, provisional application No. 61/846,110, filed on Jul. 15, 2013.

(51) Int. Cl.
*F23R 3/28* (2006.01)
*F23R 3/10* (2006.01)
*F23R 3/60* (2006.01)
*F02C 7/236* (2006.01)
*F23R 3/14* (2006.01)
(Continued)

(52) U.S. Cl.
CPC .......... *F23R 3/28* (2013.01); *B23P 19/04* (2013.01); *F02C 7/22* (2013.01); *F02C 7/2365* (2013.01); *F23R 3/10* (2013.01); *F23R 3/14* (2013.01); *F23R 3/60* (2013.01); *F23R 2900/00012* (2013.01); *Y02T 50/671* (2013.01); *Y02T 50/675* (2013.01)

(58) Field of Classification Search
CPC ...... F23R 3/28; F23R 3/14; F23R 3/10; F23R 3/60; F23R 2900/00012; F02C 7/22; F02C 7/2365
See application file for complete search history.

(56) References Cited

U.S. PATENT DOCUMENTS

| | | | |
|---|---|---|---|
| 2,701,164 A * | 2/1955 | Orent | B01F 5/20 239/400 |
| 2,752,753 A | 7/1956 | Dooley | |
| 3,915,387 A | 10/1975 | Caruel et al. | |

(Continued)

OTHER PUBLICATIONS

Extended EP Search Report dated Nov. 2, 2016.

*Primary Examiner* — Steven Sutherland
(74) *Attorney, Agent, or Firm* — O'Shea Getz P.C.

(57) ABSTRACT

A swirler is provided for a gas turbine engine. The swirler includes a swirler body with a threaded section and a multiple of circumferentially arranged tabs operable to flex radially outward. The multiple of circumferentially arranged tabs are radially displaced from the threaded section.

7 Claims, 8 Drawing Sheets

(51) Int. Cl.
*B23P 19/04* (2006.01)
*F02C 7/22* (2006.01)

(56) References Cited

U.S. PATENT DOCUMENTS

| | | | |
|---|---|---|---|
| 3,944,104 A | | 3/1976 | Watson et al. |
| 4,139,157 A | * | 2/1979 | Simmons ............. F23D 11/107 |
| | | | 239/400 |
| 5,816,049 A | | 10/1998 | Joshi |
| 5,970,716 A | * | 10/1999 | Forrester ................. F23R 3/10 |
| | | | 60/746 |
| 6,253,538 B1 | | 7/2001 | Sampath et al. |
| 6,324,828 B1 | | 12/2001 | Willis et al. |
| 6,412,272 B1 | | 7/2002 | Titterton, III et al. |
| 6,453,671 B1 | * | 9/2002 | Leen ....................... F23C 7/004 |
| | | | 239/339 |
| 7,062,920 B2 | | 6/2006 | McMasters et al. |
| 7,134,286 B2 | | 11/2006 | Markarian et al. |
| 7,140,189 B2 | | 11/2006 | Markarian et al. |
| 7,185,497 B2 | | 3/2007 | Dudebout et al. |
| 7,269,958 B2 | | 9/2007 | Stastny et al. |
| 7,308,794 B2 | | 12/2007 | Morenko et al. |
| 7,559,202 B2 | | 7/2009 | Prociw et al. |
| 7,624,576 B2 | | 12/2009 | Alkabie et al. |
| 7,658,339 B2 | | 2/2010 | Prociw et al. |
| 7,716,931 B2 | | 5/2010 | Mancini et al. |
| 7,721,436 B2 | | 5/2010 | Prociw et al. |
| 7,950,233 B2 | | 5/2011 | Alkabie et al. |
| 8,146,365 B2 | | 4/2012 | Shum et al. |
| 8,171,736 B2 | | 5/2012 | Hawie et al. |
| 2003/0061815 A1 | | 4/2003 | Young et al. |
| 2011/0008124 A1 | | 1/2011 | Niklewicz et al. |
| 2012/0272660 A1 | | 11/2012 | Garrett |

\* cited by examiner

SWIRLER MOUNT INTERFACE FOR GAS TURBINE ENGINE COMBUSTOR

CROSS-REFERENCE TO RELATED APPLICATION

This application claims priority to PCT Patent Application No. PCT/US2014/038198 filed May 15, 2014, which claims priority to U.S. Patent Appln. Ser. No. 61/878,346 filed Sep. 16, 2013 and U.S. Patent Appln. Ser. No. 61/846,110 filed Jul. 15, 2013.

STATEMENT REGARDING FEDERALLY SPONSORED RESEARCH OR DEVELOPMENT

This disclosure was made with Government support under FA8650-09-D-2923 awarded by the United States Air Force. The Government may have certain rights in this disclosure.

BACKGROUND

The present disclosure relates to a gas turbine engine and, more particularly, to a combustor therefor.

Gas turbine engines, such as those that power modern commercial and military aircraft, include a compressor section to pressurize airflow, a combustor section to burn a hydrocarbon fuel in the presence of the pressurized airflow, and a turbine section to extract energy from the resultant combustion gases.

The combustor section generally includes radially spaced inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel nozzles project into a forward section of the combustion chamber through a respective fuel nozzle swirler to supply the fuel to be mixed with the pressurized air.

The fuel nozzle swirler is typically brazed directly to the forward section of the bulkhead shell. Although effective and light-weight, the brazed assembly requires replacement of entire bulkhead sections to repair each fuel nozzle swirler. Alternatively, the fuel nozzle swirler can be mounted to the forward section bulkhead shell with various bolts and nuts. Although effective, the fasteners each require safety wires, which results in a relatively complicated and heavy arrangement which may also block cooling holes through the bulkhead shell. Blockage of cooling holes may further complicate these thermally challenged areas.

SUMMARY

A swirler is provided for a gas turbine engine. According to one disclosed non-limiting embodiment of the present disclosure, the swirler includes a swirler body with a threaded section and a multiple of circumferentially arranged tabs operable to flex radially outward. The multiple of circumferentially arranged tabs radially are displaced from the threaded section.

In a further embodiment of the present disclosure, the threaded section may include an external thread.

In a further embodiment of any of the foregoing embodiments of the present disclosure, the threaded section and the multiple of circumferentially arranged tabs may be configured to detachably engage with a bulkhead support shell of a combustor.

In a further embodiment of any of the foregoing embodiments of the present disclosure, the threaded section may be configured to detachably engage with a boss of the bulkhead support shell of the combustor.

In a further embodiment of any of the foregoing embodiments of the present disclosure, the swirler may have a longitudinal axis. The threaded section may be defined along the longitudinal axis. The multiple of circumferentially arranged tabs may be radially displaced outward from the threaded section relative to the longitudinal axis.

In a further embodiment of any of the foregoing embodiments of the present disclosure, the multiple of circumferentially arranged tabs may extend axially beyond the swirler threaded section.

In a further embodiment of any of the foregoing embodiments of the present disclosure, the multiple of circumferentially arranged tabs may each include a lip.

A combustor of a gas turbine engine is provided. According to another disclosed non-limiting embodiment of the present disclosure, the combustor includes a bulkhead support shell with a swirler boss. The swirler boss includes a multiple of circumferentially arranged ramps extending radially from the swirler boss. The combustor also includes a swirler body with a threaded section defined around a swirler longitudinal axis. The swirler body includes a multiple of circumferentially arranged tabs, which are radially displaced from the threaded section.

In a further embodiment of any of the foregoing embodiments of the present disclosure, the multiple of circumferentially arranged ramps may be directed outward with respect to the swirler central longitudinal axis.

In a further embodiment of any of the foregoing embodiments of the present disclosure, each of the multiple of circumferentially arranged ramps may define a step.

In a further embodiment of any of the foregoing embodiments of the present disclosure, the multiple of circumferentially arranged tabs may extend axially beyond the swirler threaded section.

In a further embodiment of any of the foregoing embodiments of the present disclosure, the multiple of circumferentially arranged tabs may each include a lip.

A method of assembling a swirler within a combustor is provided. According to another disclosed non-limiting embodiment of the present disclosure, the method includes detachably mounting a swirler to a bulkhead support shell using a threaded mount interface defined between the swirler and the bulkhead support shell and a multiple of circumferentially arranged tabs on the swirler.

In a further embodiment of any of the foregoing embodiments of the present disclosure, the method may include rotating the swirler to drive the multiple of circumferentially arranged tabs over structure of the bulkhead support shell configured to receive the tabs.

In a further embodiment of any of the foregoing embodiments of the present disclosure, the bulkhead support shell may include a multiple of circumferentially arranged ramps.

In a further embodiment of any of the foregoing embodiments of the present disclosure, the method may include rotating the swirler to snap the multiple of circumferentially arranged tabs over the multiple of circumferentially arranged ramps. Each of the multiple of circumferentially arranged ramps may define a step configured to receive a respective tab.

In a further embodiment of any of the foregoing embodiments of the present disclosure, each of the tabs may include a lip configured to engage a respective tab.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
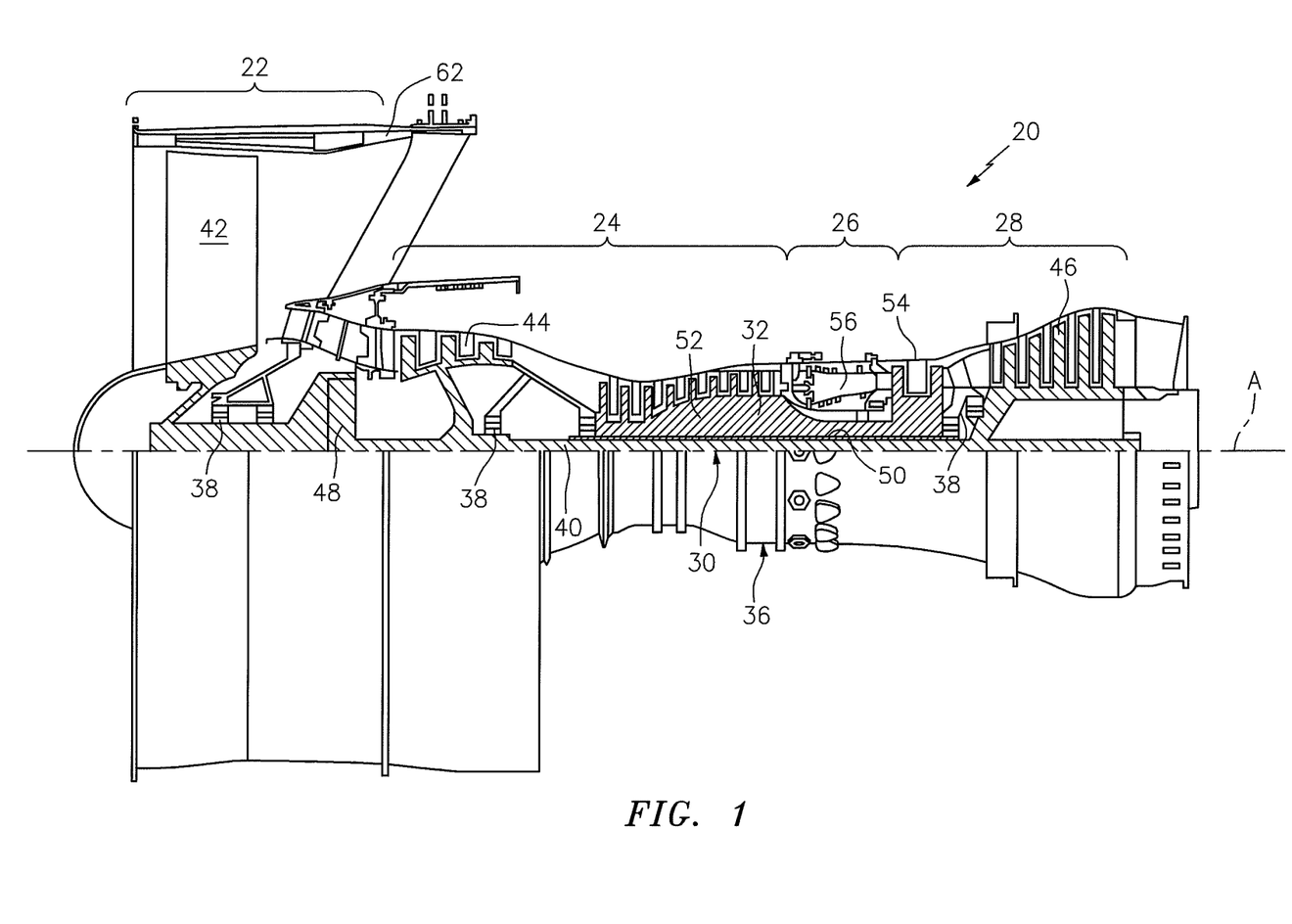
FIG. 1 is a schematic cutaway of a gas turbine engine.
Figure 2:
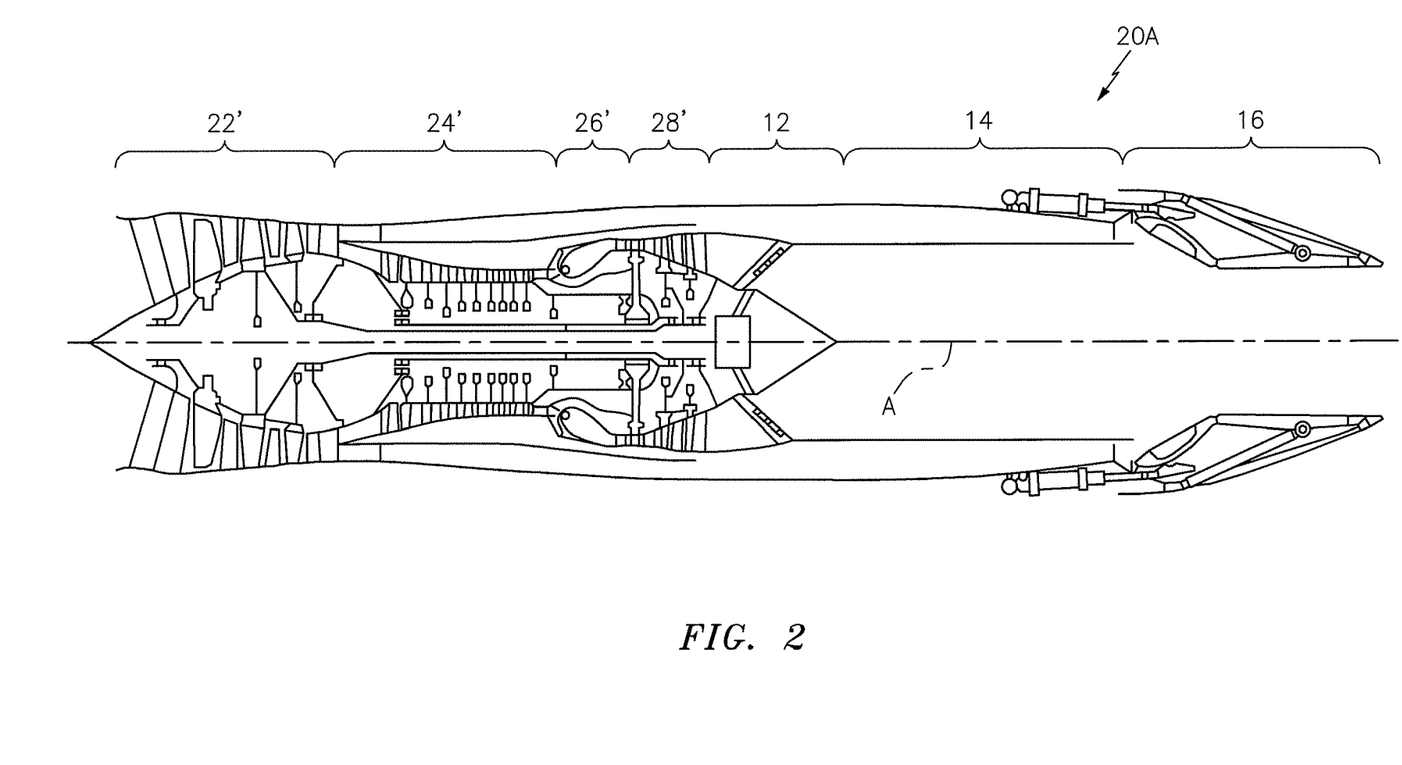
FIG. 2 is a schematic cross-section of another gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Referring to FIG. 2, alternative engine architectures 20A may also include an augmentor section 12, an exhaust duct section 14 and a nozzle section 16 among other systems or features. Referring again to FIG. 1, the fan section 22 drives air along a bypass flowpath and a core flowpath for compression in the compressor section 24, communication into the combustor section 26 then expansion through the turbine section 28. Although primarily depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the low pressure compressor (LPC) and the high pressure compressor (HPC) and an intermediate pressure turbine (IPT) between the high pressure turbine (HPT) and the low pressure turbine (LPT).

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 may drive the fan 42 directly or through a geared architecture 48 as shown in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor module 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 and then the HPC 52, mixed with the fuel and burned in the combustor module 56, then expanded over the HPT 54 and LPT 46. The LPT 46 and HPT 54 rotationally drive the respective low spool 30 and high spool 32 in response to the expansion.

The main engine shafts 40 and 50 are supported at a plurality of points by the bearing structures 38 within the static structure 36. It should be understood that various bearing structures 38 at various locations may alternatively or additionally be provided.

Figure 3:
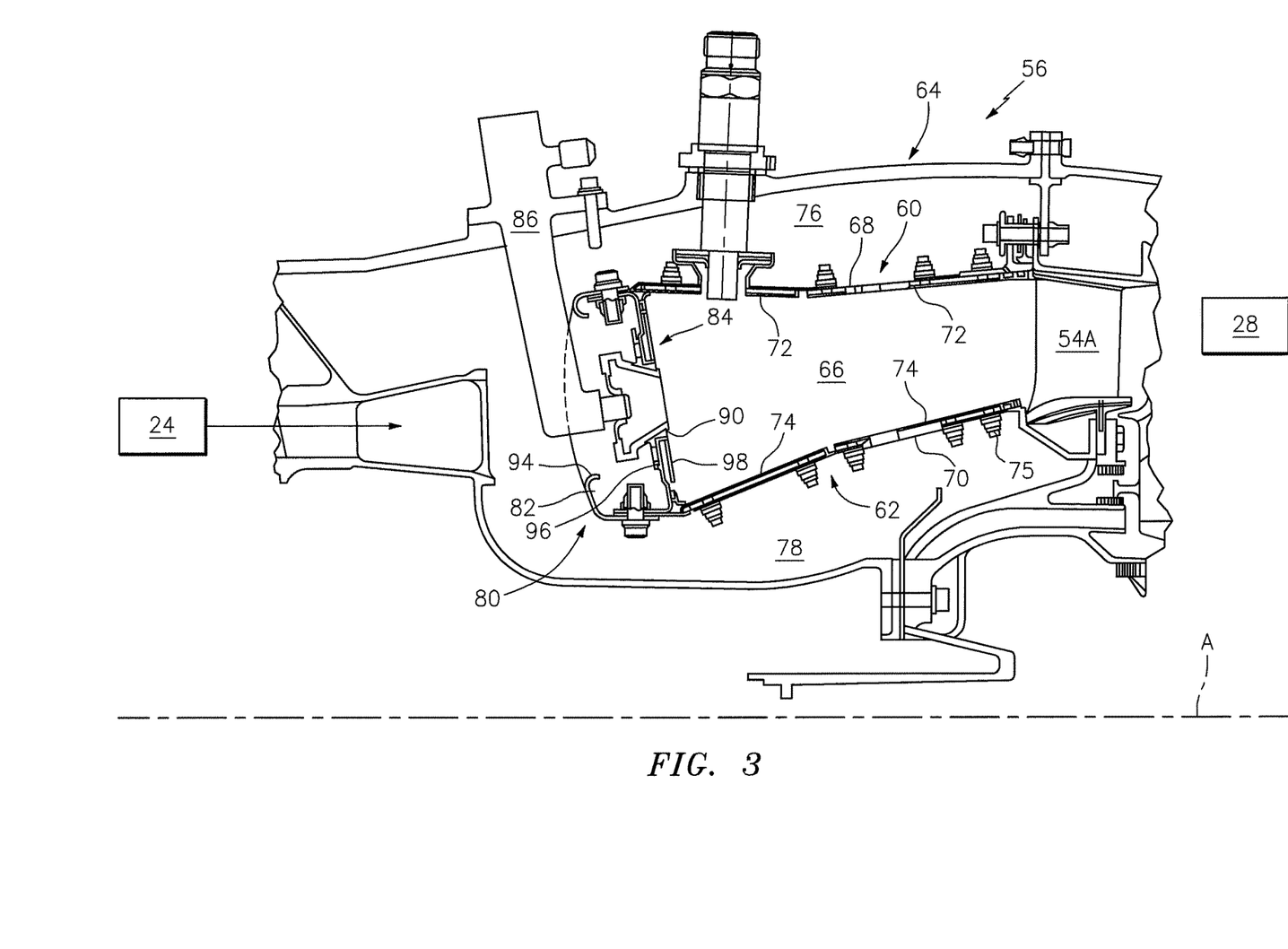
FIG. 3 is a partial sectional view of an exemplary annular combustor that may be used with the gas turbine engine shown in FIG. 1.

With reference to FIG. 3, the combustor module 56 generally includes a combustor outer wall 60 and a combustor inner wall 62. The outer wall 60 and the inner wall 62 are spaced inward from a diffuser case 64. The outer wall 60 and the inner wall 62 define a chamber 66 therebetween. The chamber 66 is generally annular in shape.

The outer wall 60 and the diffuser case 64 define an annular outer plenum 76. The inner wall 62 and the diffuser case 64 define an annular inner plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

Each wall 60, 62 generally includes a respective support shell 68, 70 that supports one or more respective liners 72, 74 mounted to the respective support shell 68, 70. Each of the liners 72, 74 may be generally rectilinear and manufactured of, for example, a nickel based super alloy or ceramic material.

The combustor module 56 further includes a forward assembly 80 immediately downstream of the compressor section 24 to receive compressed airflow therefrom. The forward assembly 80 generally includes an annular hood 82 and a bulkhead subassembly 84 to locate a multiple of fuel nozzles 86 (one shown) and a multiple of swirlers 90 (one shown). Each of the swirlers 90 is mounted within a respective opening 92 in the bulkhead subassembly 84.

The annular hood 82 extends radially between, and is secured to, the forwardmost ends of the walls 60, 62. The annular hood 82 includes a multiple of circumferentially distributed hood ports 94 that accommodate the respective fuel nozzle 86 to introduce air into the respective multiple of swirlers 90. Each fuel nozzle 86 may be secured to the outer case 64 to project through one of the hood ports 94 and into the respective swirler 90 along axis F (shown in FIG. 4).

The forward assembly 80 directs a portion of the core airflow into the forward end of the combustion chamber 66 while the remainder enters the annular outer plenum 76 and the annular inner plenum 78. The multiple of fuel nozzles 86, swirler 90 and surrounding structure generate a swirling, intimately blended fuel-air mixture that supports combustion in the chamber 66.

Figure 4:
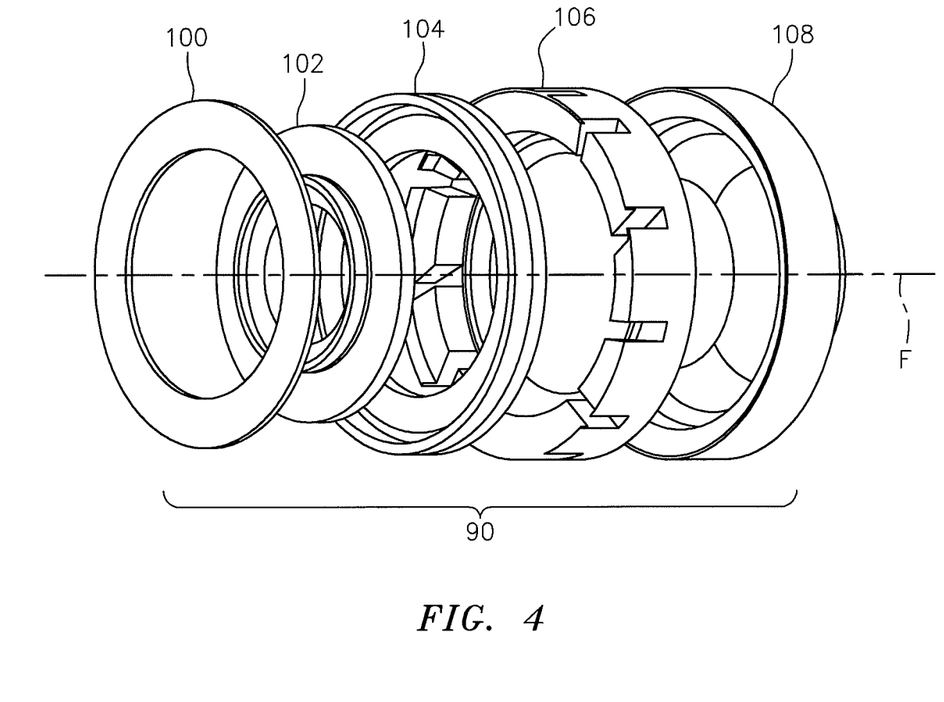
FIG. 4 is an exploded view of a swirler.

With reference to FIG. 4, each swirler 90 generally includes a capture plate 100, a nozzle guide 102, a guide housing 104, a swirler inner body 106 and a swirler outer body 108 along its swirler central longitudinal axis F.

Figure 5:
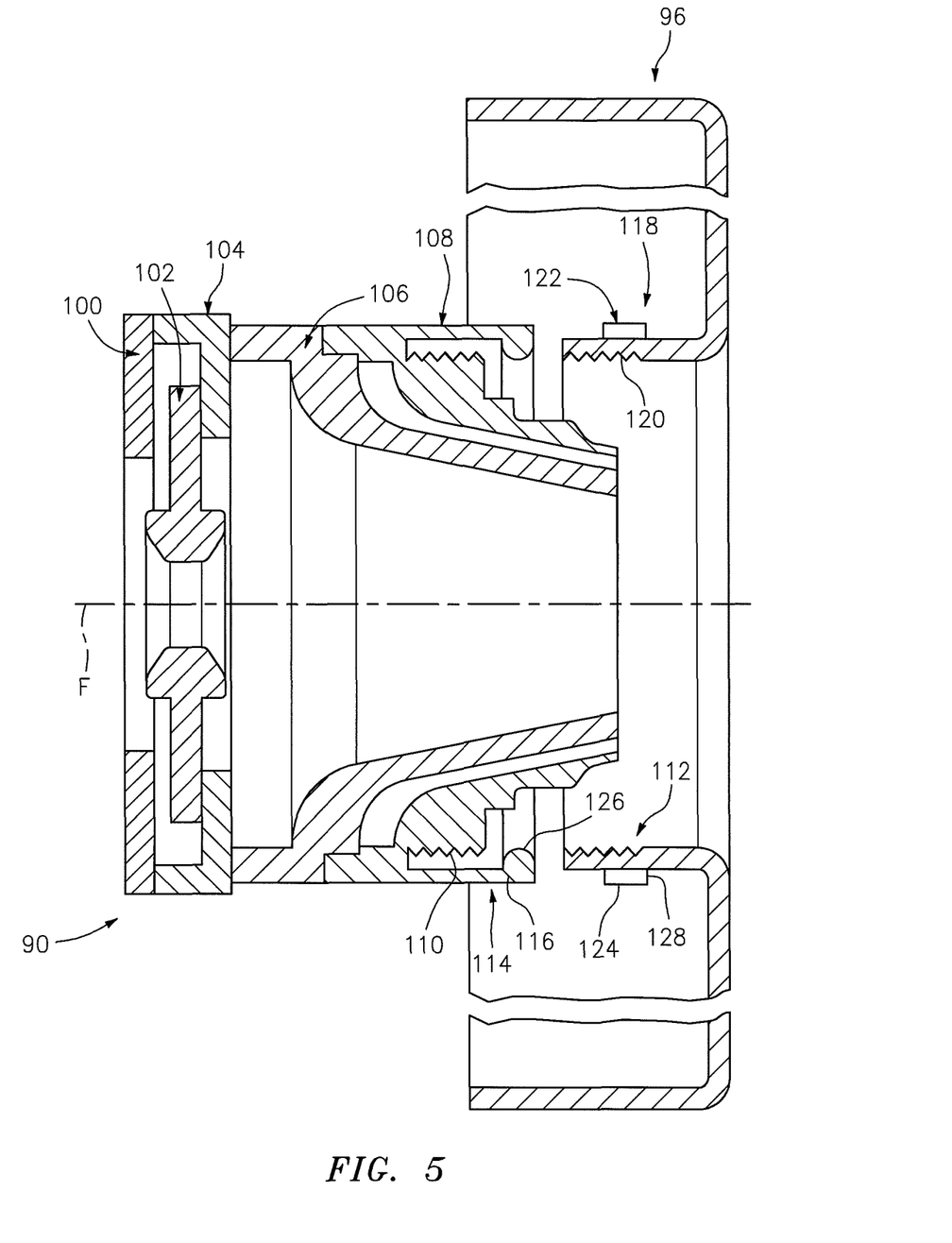
FIG. 5 is an exploded sectional view of a threaded mount interface defined by the swirler and a bulkhead support shell.

Referring to FIG. 5, the capture plate 100 is mounted to the guide housing 104 to retain the nozzle guide 102 such that the nozzle guide 102 is movable with respect to the guide housing 104. It should be appreciated that any number of swirler body components as well as alternative or additional components may be utilized herewith and that the swirler body shown is merely but one example assembly.

Each swirler 90 is attached to a respective bulkhead support shell 96 of the bulkhead subassembly 84 at a threaded mount interface 112. The threaded mount interface 112 is defined around the swirler central longitudinal axis F to facilitate removal, repair or replacement of each individual swirler 90.

The threaded mount interface 112 of the swirler outer body 108 includes a swirler threaded section 110 defined generally around a swirler central longitudinal axis F. In one disclosed non-limiting embodiment, the swirler threaded section 110 is directed outward with respect to the swirler central longitudinal axis F.

Figure 6:
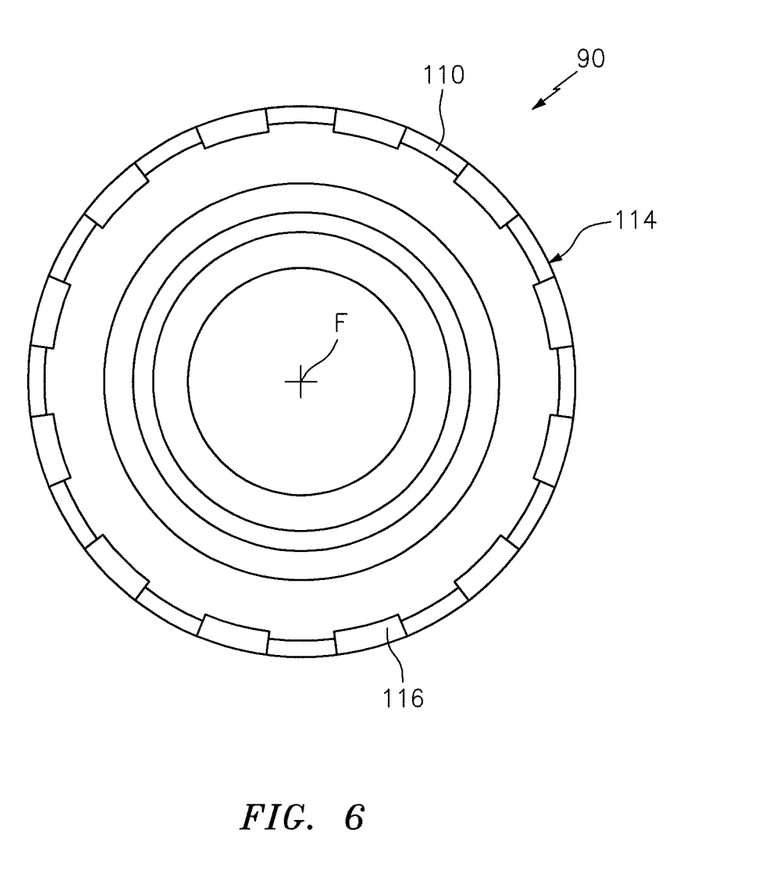
FIG. 6 is a front view of the swirler.

An anti-rotation lock 114 at least partially surrounds and extends axially beyond the swirler threaded section 110. The anti-rotation lock 114 includes a multiple of circumferentially arranged tabs 116 (see also FIG. 6) that may flex radially outward as the swirler 90 is threaded to the bulkhead support shell 96. It should be appreciated that radial as defined herein is generally with respect to the swirler central longitudinal axis F but may include other flexible components.

Referring still to FIG. 5, each bulkhead support shell 96 includes a swirler boss 118 with a boss threaded section 120 defined around the swirler central longitudinal axis F. The boss threaded section 120 defines a portion of the threaded mount interface 112 operable to receive the swirler threaded section 110. In one disclosed non-limiting embodiment, the threads of the boss threaded section 120 is directed inward with respect to the swirler central longitudinal axis F.

Figure 7:
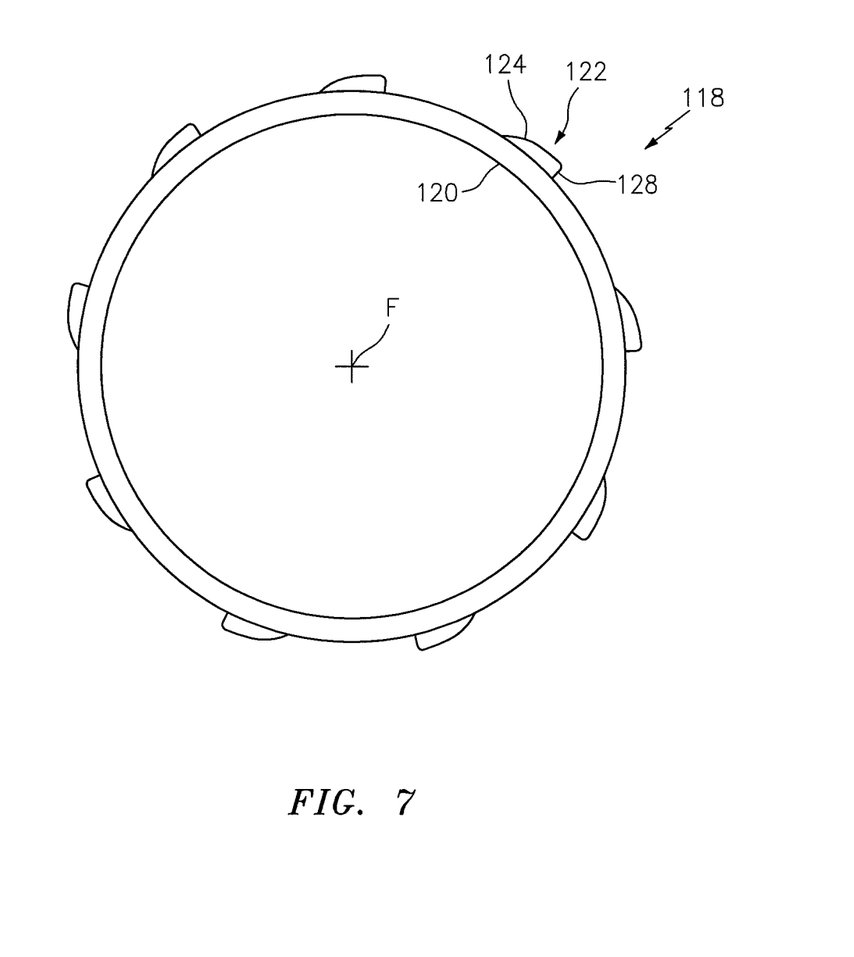
FIG. 7 is a rear view of a bulkhead swirler boss.

The swirler boss 118 defines a multiple of circumferentially arranged ramps 122 that radially extend in an outward direction with respect to the swirler central longitudinal axis F (see FIG. 7). The multiple of circumferentially arranged ramps 122 are circumferentially spaced to receive the multiple of circumferentially arranged tabs 116 (see FIG. 6) therebetween when the swirler 90 is installed (see FIG. 8).

Figure 8:
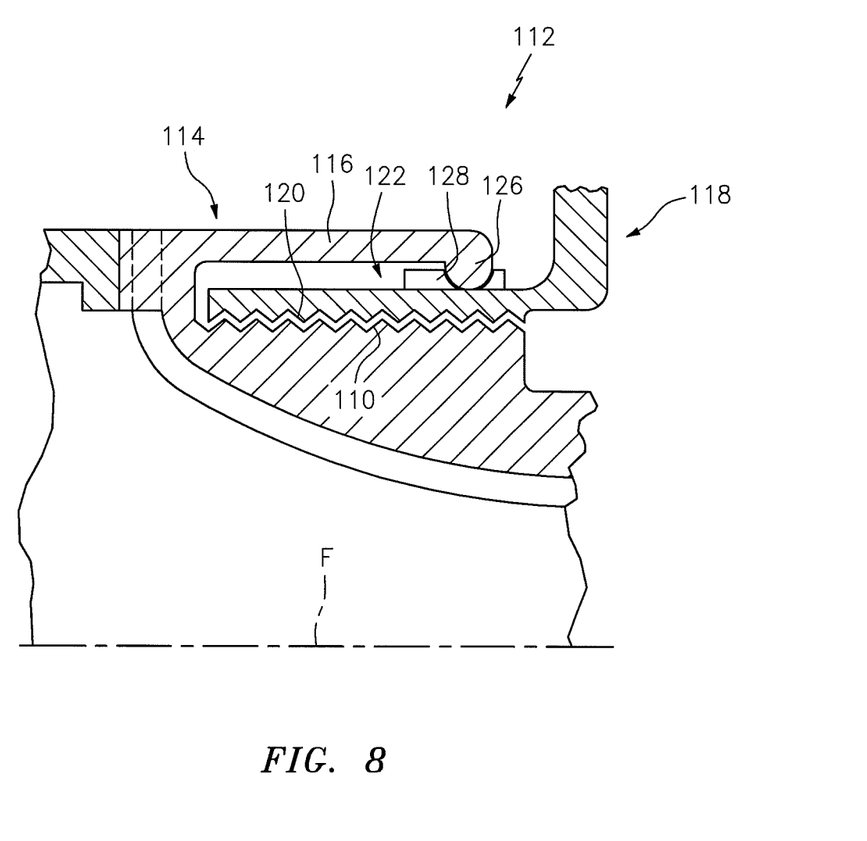
FIG. 8 is an enlarged sectional view of the threaded mount interface with the swirler engaged with the bulkhead swirler boss.

Referring to FIGS. 5 and 8, the multiple of circumferentially arranged ramps 122 provide an interface surface to outwardly flex the multiple of circumferentially arranged tabs 116 as the swirler 90 is threaded into the boss threaded section 120. That is, the swirler threaded section 110 is threaded into the boss threaded section 120 to an axial position at which the opposed multiple of circumferentially arranged tabs 116 ride up a ramp surface 124 of the multiple of circumferentially arranged ramps 122 until the swirler 90 is fully installed and the circumferentially arranged tabs 116 snap over a step surface 128 of the respective circumferentially arranged ramps 122 (see FIG. 8). It should be appreciated that the circumferentially arranged tabs 116 may include a lip 126 that extends radially inward. Alternatively, the circumferentially arranged tabs 116 may be flat fingers and include a complementary ramp surface or other shape to facilitate interface with the multiple of circumferentially arranged ramps 122.

The multiple of circumferentially arranged ramps 122 and the opposed multiple of circumferentially arranged tabs 116 thereby provide the anti-rotation lock 114 which prevents the swirler 90 from axially backing out. It should be appreciated that the number of circumferentially arranged tabs 116 need not be equivalent to the number of circumferentially arranged ramps 122.

Removal of the swirler 90 may include merely unscrewing the swirler 90 to drive the multiple of circumferentially arranged tabs 116 back over the multiple of circumferentially arranged ramps 122. Although more force may be required to unscrew the swirler 90 rather than to screw in the swirler 90, such forces may still be readily accomplished manually.

The threaded mount interface 112 provides a robust removable joint with minimal components that facilitates ready replacement of the swirler 90. It should be appreciated that various coating may be applied to the threaded mount interface 112 to minimize the possibility of thread lock. Moreover, the anti-rotation lock 114 provides a secure fail-safe redundant retention for the threaded mount interface 112.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with one or more features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A combustor of a gas turbine engine, comprising:
a bulkhead support shell with a swirler boss, said swirler boss including a multiple of circumferentially arranged ramps extending radially from said swirler boss; and a swirler body with a threaded section defined around a swirler longitudinal axis, said swirler body including a multiple of circumferentially arranged tabs radially displaced from said threaded section,
wherein said multiple of circumferentially arranged tabs each include a lip.

2. The combustor as recited in claim 1, wherein said multiple of circumferentially arranged ramps are directed outward with respect to said swirler longitudinal axis.

3. The combustor as recited in claim 2, wherein each of said multiple of circumferentially arranged ramps define a step.

4. The combustor as recited in claim 1, wherein said multiple of circumferentially arranged tabs extend axially beyond said threaded section.

5. A method of assembling a swirler within a combustor, the method comprising:

detachably mounting a swirler to a bulkhead support shell using a threaded mount interface defined between said swirler and said bulkhead support shell; and
rotating said swirler to drive a multiple of circumferentially arranged tabs of said swirler over a structure of the bulkhead support shell configured to receive the multiple of circumferentially arranged tabs.

6. The method as recited in claim 5, wherein the structure of the bulkhead support shell includes a multiple of circumferentially' arranged ramps.

7. The method as recited in claim 6, further comprising rotating the swirler to snap the multiple of circumferentially arranged tabs over the multiple of circumferentially arranged ramps, wherein each of the multiple of circumferentially arranged ramps defines a step configured to receive a respective tab.

* * * * *